Sept. 7, 1965  R. A. SWADELL  3,205,497
TERMINAL GUIDANCE SYSTEM FOR NAVIGABLE CRAFT
Filed Oct. 24, 1961  6 Sheets-Sheet 1

INVENTOR.
ROBERT A. SWADELL
BY
Sughrue, Rothwell, Mion, and Zinn
ATTORNEYS.

Sept. 7, 1965    R. A. SWADELL    3,205,497
TERMINAL GUIDANCE SYSTEM FOR NAVIGABLE CRAFT
Filed Oct. 24, 1961    6 Sheets-Sheet 2

INVENTOR.
ROBERT A. SWADELL
BY
Sughrue, Rothwell, Mion and Zinn
ATTORNEYS.

Sept. 7, 1965 R. A. SWADELL 3,205,497
TERMINAL GUIDANCE SYSTEM FOR NAVIGABLE CRAFT
Filed Oct. 24, 1961 6 Sheets-Sheet 3

INVENTOR.
ROBERT A. SWADELL
BY
Sughrue, Rothwell, Mion, and Zinn
ATTORNEYS.

Sept. 7, 1965 R. A. SWADELL 3,205,497
TERMINAL GUIDANCE SYSTEM FOR NAVIGABLE CRAFT
Filed Oct. 24, 1961 6 Sheets-Sheet 4
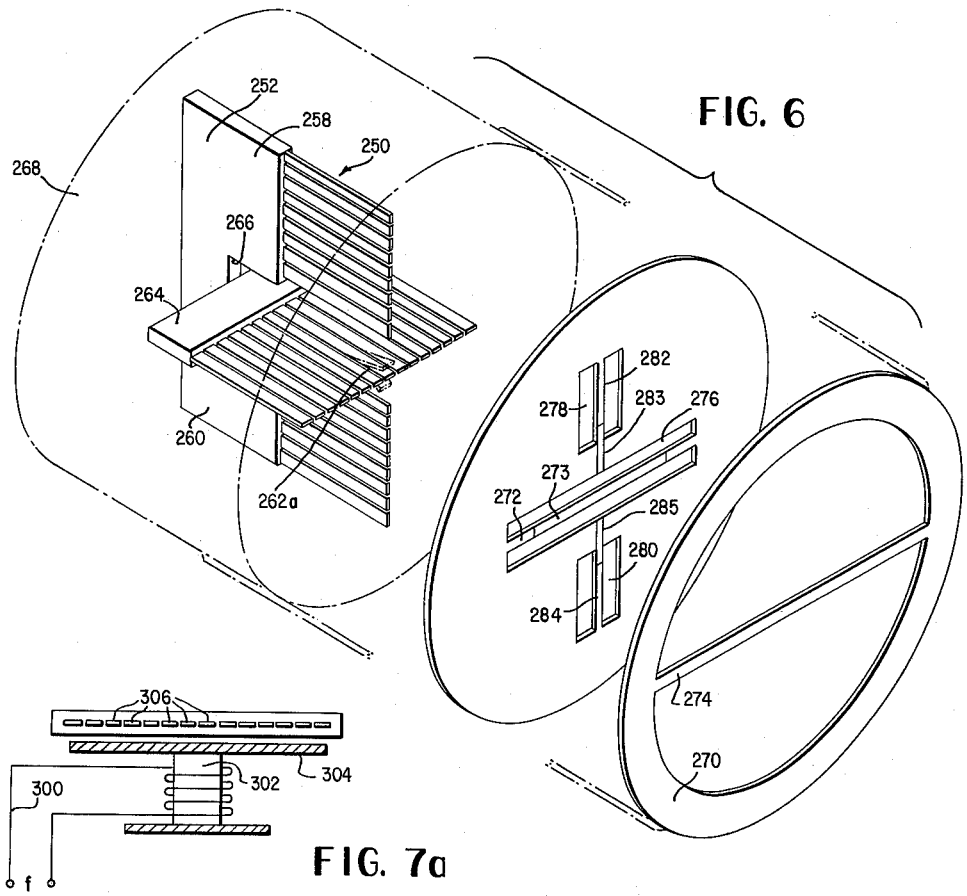
FIG. 6
FIG. 7a
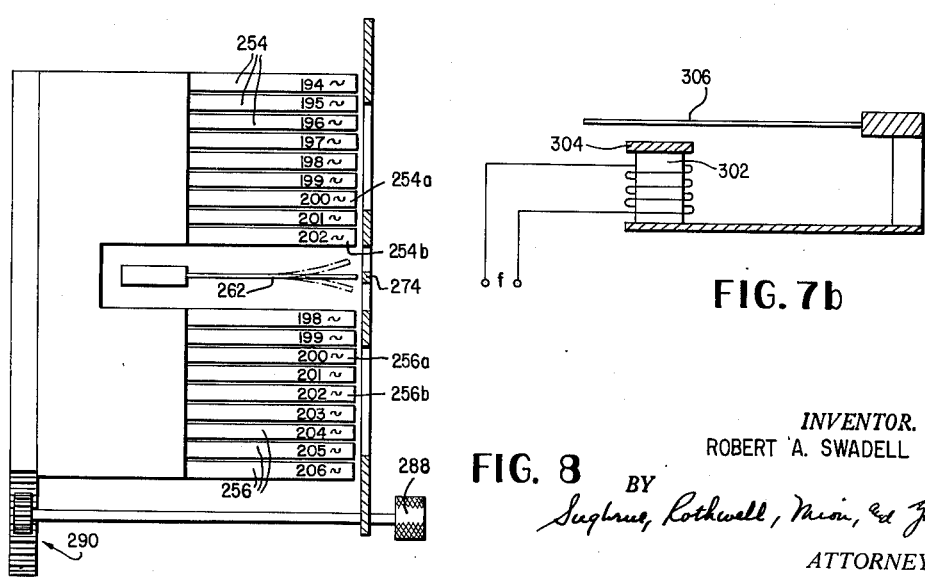
FIG. 7b
FIG. 8
INVENTOR.
ROBERT A. SWADELL
BY
ATTORNEYS.

Sept. 7, 1965   R. A. SWADELL   3,205,497
TERMINAL GUIDANCE SYSTEM FOR NAVIGABLE CRAFT
Filed Oct. 24, 1961   6 Sheets-Sheet 5

INVENTOR.
ROBERT A. SWADELL
BY
Sughrue, Rothwell, Mion, and Zinn
ATTORNEYS.

Sept. 7, 1965 R. A. SWADELL 3,205,497
TERMINAL GUIDANCE SYSTEM FOR NAVIGABLE CRAFT
Filed Oct. 24, 1961 6 Sheets-Sheet 6

INVENTOR.
ROBERT A. SWADELL
BY
ATTORNEYS.

United States Patent Office 3,205,497
Patented Sept. 7, 1965

3,205,497
TERMINAL GUIDANCE SYSTEM FOR NAVIGABLE CRAFT
Robert A. Swadell, Fort Totten, N.Y.
(565A Pleasonton Road, Fort Bliss, Tex.)
Filed Oct. 24, 1961, Ser. No. 147,359
6 Claims. (Cl. 343—108)

This invention relates generally to a terminal guidance system for navigable craft and, more particularly, to an improved position indicating system for aircraft wherein the pilot remains in full control of the aircraft as it approaches the landing area.

In the past, terminal guidance systems have been either of the ground control approach (GCA) type or the instrument landing system (ILS) type. In the GCA type, radar apparatus on the ground determines the location of the aircraft. From this determination, personnel on the ground may transmit landing instructions by radio to the aircraft pilot. The ground personnel direct control of the aircraft as they "talk down" the aircraft to a landing. GCA systems have never gained acceptance by aircraft pilots since the pilots have no control over decisions being made with respect to the landing. GCA systems may also be designed so that the radar equipment operates radio transmitting devices automatically to send control signals directly to the aircraft control system, thereby taking away from the pilot even the manual operation of the aircraft. Such a system, of course, also incorporates all the disadvantages of the "talk down" GCA and, furthermore, obviously requires expensive and complex ground and aircraft apparatus, thereby preventing its wide acceptance.

The ILS system in use today is of the type described in Hefels Patent No. 2,266,930 and requires complex and expensive directional radio beacons to provide position indications to the pilot. Another disadvantage of this system is that the receiving equipment required in the aircraft is also complex and expensive thereby limiting its wide application to general aviation. In particular, the cost of such equipment becomes prohibitive to owners of small private aircraft. The use of precise antenna arrays on the ground to develop the required lobe patterns generally limit the application of such a system to a specific runway regardless of wind conditions or the desirability of landing in other directions. A further disadvantage of such a system is that it generally becomes useless below two hundred feet because of the distortion of the beacon patterns caused by ground reflection.

Therefore, the principal object of this invention is to provide an improved terminal guidance system which incorporates the advantages of the prior art GCA and ILA systems and eliminates their disadvantages.

A more specific object is to provide an improved position indicating system which utilizes present GCA ground radar and radio equipment while at the same time allowing the pilot to remain in full control of his aircraft prior to landing.

Another object of this invention is to provide an aircraft pilot with both audible and visual indications of the aircraft's actual attitude and the required glide path prior to landing.

A further object is to provide an improved instrument landing system wherein non-directional frequency-modulated signals provide to the aircraft pilot a visual indication of the actual position of the aircraft and also of the required glide path of the aircraft as it approaches a landing area.

Still another object is to provide an improved instrument landing system whose sensitivity progressively increases as the aircraft approaches the landing strip with maximum accuracy occuring at touchdown.

Another object is to provide means for varying the rate at which the sensitivity increases.

Another object is to provide such a system which the pilot can readily check for accuracy and correct functioning at any time.

A still further object is to provide an instrument landing system incorporating a novel tuned reed indicator which provides, in a single indicator, a visual representation of the aircraft's actual range and its relative azimuth and height with respect to the required glide slope.

Other objects and advantages of this system will become apparent from the following description taken in conjunction with the drawings which together explain in detail a preferred embodiment of this invention.

In the drawings:

FIGURES 5a and 5b show another type of indicator which may be used in conjunction with the systems of FIGURES 1 and 2;

FIGURE 6 is a perspective view of a novel tuned reed indicator incorporated in an aircraft attitude indicator in accordance with this invention;

FIGURES 7a and 7b show details of the tuned reed indicator;

FIGURE 8 is a side view of the indicator shown in FIGURE 7;

Briefly, in accordance with the preferred embodiment of this invention, there is provided a terminal guidance system utilizing presently installed GCA radar equipment located on the ground to present to the pilot a visual indication of the position of an aircraft as it approaches a landing strip. One radar display unit determines the aircraft's altitude relative to the required glide slope, and another radar display unit shows the azimuth of the aircraft relative to the required glide slope. Associated with each display unit is a variable, audio frequency oscillator. The oscillators operate within different frequency ranges. An operator on the ground varies the frequency of each oscillator to correspond to the position of the aircraft in such a manner that the system becomes more accurate as the aircraft approaches its touchdown point. Each oscillator output frequency modulates the radio frequency carrier of a radio transmitter also located on the ground. The modulated RF signals are demodulated by apparatus located in the aircraft and the audio frequency signals are applied to a novel tuned reed indicator which quickly provides a simultaneous indication of both the relative height and azimuth of the aircraft with respect to the required glide slope. This tuned reed indicator is incorporated within the present climb and bank or attitude indicator already mounted in the instrument panel of aircraft. Alternatively, appropriate D.C. control signals may be derived from the audio frequency signals to operate omni-indicator which may be already mounted in an aircraft for use in conjunction with existing ILS systems.

Figure 1:
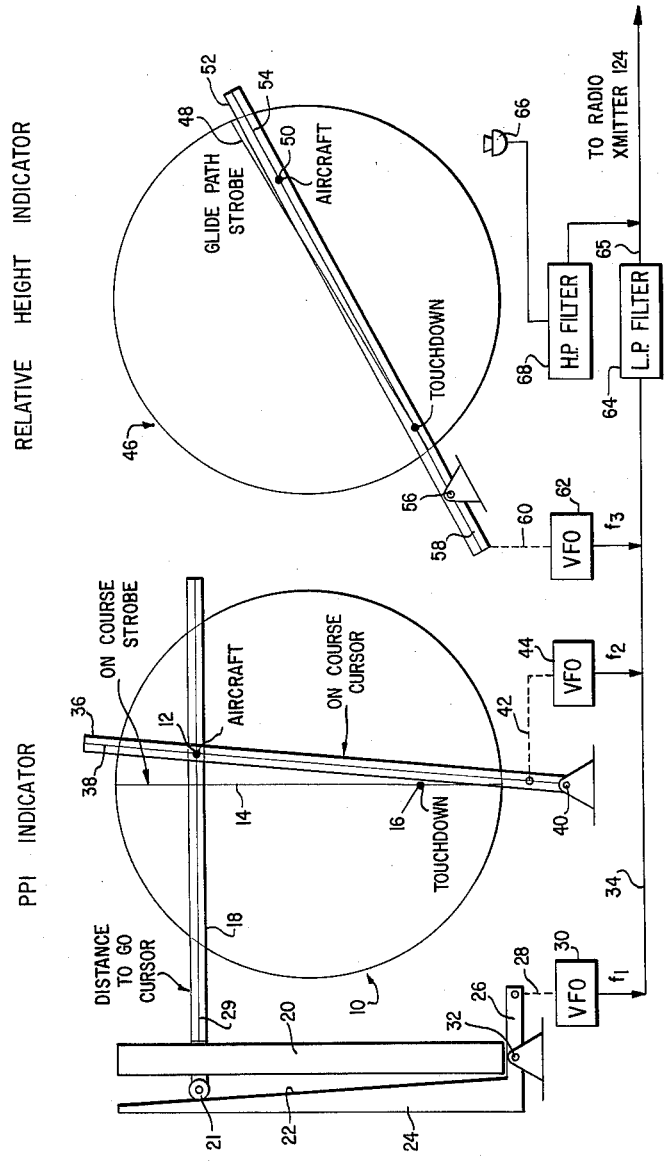
FIGURE 1 shows manually controlled ground apparatus for use in an instrument landing system embodying this invention.

In FIGURE 1, there is shown manually operated ground equipment for this improved instrument landing system. The plan position indicator (PPI) 10 indicates a position 12 of an aircraft within the range of the radar apparatus. PPI indicator 10 may be considered as the "on course" or azimuth determining unit. The required azimuth for a plane on a predetermined glide slope may be indicated on PPI indicator 10 by means of an electronically controlled strobe which appears as a line 14. Such a strobe line could also be mechanically scribed on the indicator. The point 16 on strobe line 14 represents the position of an aircraft as it touches down on the landing strip. Disposed over the face of indicator 10 in this manual type ground equipment is a distance cursor 18 which is slideably mounted for vertical movement on a fixed post 20. A roller 21 is mounted on the left-hand end of cursor 18 for engagement with the sloping inner surface 22 of a rocker arm 24. The lower right-hand portion 26 of arm 24 is connected to a suitable mechanical linkage 28 to a variable, audio frequency oscillator 30 whose output frequency is designated $f_1$.

In operation, when the ground equipment operator picks up an indication of an aircraft on PPI indicator 10, he moves cursor 18 so that the hairline 29 lies directly over the blip 12 representing the position of an aircraft approaching the landing strip for a landing. As cursor 18 is moved in a vertical direction, roller 21 engages surface 22 to pivot arm 24 about the pivot point 32 thereby causing linkage 28 to vary the audio frequency output $f_1$ of oscillator 30. The output signal of oscillator 30 is then coupled to a conductor 34 which carries the signal to a radio transmitter 124 shown in FIGURE 2.

In like manner, an "on course" or azimuth cursor 36 is also suitably mounted on indicator 10 so that its hairline 38 may be placed directly over the displayed position 12 of an approaching aircraft. The operator follows the course of the aircraft by pivoting cursor 36 about point 40. The movement of cursor 36 is transmitted by means of a suitable mechanical linkage 42 to another variable, audio frequency oscillator 44 whose output frequency $f_2$ varies in accordance with the position of cursor 36. The signal $f_2$ is also applied to the common conductor 34 which is coupled to the radio transmitter for the purpose described below. The range of output frequencies from oscillator 44 is set to be different from that of oscillator 30 so that frequencies $f_1$ and $f_2$ never overlap. For example, the frequency range of oscillator 30 may be from 290 to 310 cycles per second and the range of oscillator 44 from 240 to 260 cycles per second. When cursor hairline 38 coincides with blip 12 and the "on course" strobe line 14, then the approaching aircraft is flying on the proper course or azimuth of the predetermined azimuth and oscillator 44 is generating a predetermined frequency $f_2$ which corresponds to the "on course" position of the approaching aircraft.

Another display unit 46 associated with the ground radar equipment may be utilized to display the relative altitude of an approaching aircraft with respect to the altitude of the required glide slope for any distance from the aircraft touchdown point. As with the PPI indicator 10, a strobe line 48 on indicator 46 indicates the required glide slope for a landing aircraft. Strobe 48 may be positioned on indicator 46 to correspond to desired glide slope for different aircraft. As the position blip 50 of an approaching aircraft is displayed on indicator 46, the ground equipment operator places a glide slope cursor 52 over blip 50 so that the hairline 54 exactly coincides with the blip. The operator then moves cursor 52 towards strobe line 48 as the aircraft approaches the required glide slope and when hairline 54 and strobe line 48 coincide, the approaching aircraft is at the correct altitude on the required glide slope. As cursor 52 is moved, it pivots about point 56 so that the movement of the lower portion 58 is coupled by means of a mechanical linkage 60 to a third variable, audio frequency oscillator 62 whose output frequency $f_3$ is also connected to the common conductor 34. The output frequency of oscillator 62 is set so that it does not overlap the frequencies $f_1$ and $f_2$ and, for example, is variable within the range of 190 to 210 cycles per second. When the approaching aircraft is on the proper glide slope and hairline 50 is placed over strobe line 48, then oscillator 62 generates a signal $f_3$ corresponding to a relative error of zero, thereby indicating that the aircraft is on the proper slope. Signals $f_1$, $f_2$, $f_3$ are then passed through a low-pass filter 64 whose output is coupled via a conductor 65 to the radio transmitter to frequency modulate the output thereof. In order to permit ground personnel to talk to the pilot in the approaching aircraft simultaneously with the frequencies $f_1$, $f_2$ and $f_3$, a microphone 66 may be coupled through a high-pass filter 68 to conductor 65 and also used to either frequency modulate or amplitude modulate the output of the radio transmitter.

A great advantage of the indicator, cursor and variable frequency oscillator arrangement shown in FIGURE 1 is that the system becomes more sensitive as the aircraft approaches its touchdown point. Such a feature is extremely important to pilots and commercial airline companies since present ILS systems very often are completely useless below an altitude of two hundred feet. The desirable result obtained by my improved system can be seen by looking at PPI indicator 10, for example, with particular reference to the "on course" cursor 36. It can be seen that, as the aircraft approaches the touchdown point represented by point 16 on the indicator, a relatively small translation movement of cursor 36 will provide a relatively large change in the output frequency $f_2$ of oscillator 44 as compared with the same translational movement when the plane is located at position 12. In other words, for the same angular movement of cursor 36, the control of the oscillator 44 becomes more sensitive the closer the aircraft is to touchdown. Of course, for the same reason, indicator 46 and its associated oscillator 62 become more sensitive as the aircraft approaches its touchdown point. The rate at which sensitivity increases as touchdown is approached may be varied by either electronically changing the position of the strobe line relative to the cursor or by mechanically changing the position of the cursor relative to the strobe line.

Figure 2:
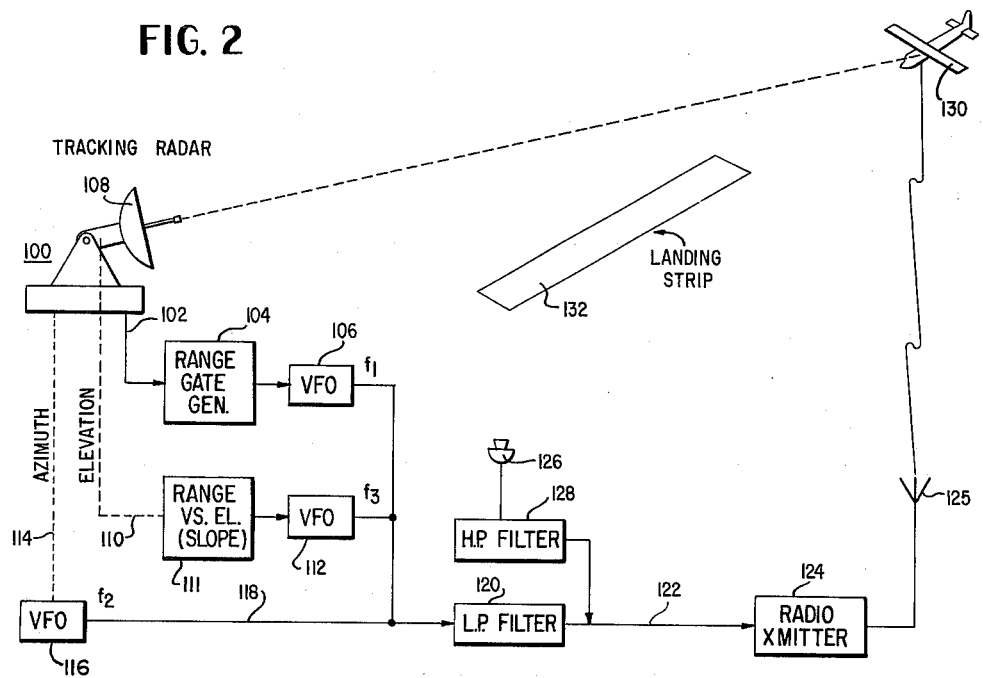
FIGURE 2 shows automatic, radar controlled ground apparatus.

FIGURE 2 shows automatic ground equipment for use with my improved ILS system wherein the tracking radar apparatus 100 automatically controls the radio transmitter 124 which sends to the aircraft a radio signal modulated by frequencies $f_1$, $f_2$ and $f_3$. Radar apparatus 100 radiates pulses to determine the distance or range of an approaching aircraft 130 and also automatically tracks the aircraft by mechaniclly moving in the vertical and horizontal planes to correspond to the altitude and azimuth, respectively, of the approaching aircraft.

The distance or range output of radar apparatus 100 is electrically coupled via a conductor 102 through a conventional range gate generator 104 to a variable, audio frequency oscillator 106 whose output frequency $f_1$ is varied within the same range as the output of VFO 30 in FIGURE 1. The altitude of the approaching aircraft is determined by the angular position of the radar dish antenna 108. The movement of antenna 108 is transmitted via a suitable mechanical linkage 110 to a range-versus-elevation generator 111 which produces an analog output voltage representative of the relative height of the approaching aircraft 130 with respect to the required glide slope. This analog voltage is coupled to a voltage controlled, audio frequency oscillator 112 whose output frequency $f_3$ is in the same range as the output of oscillator 62.

In like manner, the azimuth or course of the approaching aircraft 130 is sensed by the rotational movement of the tracking radar apparatus 100, which movement is then transmitted by another suitable mechanical linkage 114 to another variable, audio frequency oscillator 116 whose output frequency $f_2$ is in the same range as the output of oscillator 44. The signal $f_1$, $f_2$ and $f_3$ are all coupled to a common conductor 118, fed through a low-pass filter 120 and then coupled via conductor 122 to frequency modulate the output of radio transmitter 124. As with the manual equipment shown in FIGURE 1, ground personnel may talk with the aircraft pilot by means of a microphone 126 which is coupled through a high-pass filter 128 to a conductor 122 to frequency or amplitude modulate the output of the radio transmitter. The radio beam emanating from the antenna 125 of transmitter 124 is detected by suitable receiving apparatus located in the aircraft 130 as it approaches the landing strip 132.

Of course, it is to be understood that more than one aircraft may be simultaneously guided to a landing by means of my improved ILS system. For example, the receiving apparatus in a second aircraft may be made responsive to frequencies $f_4$, $f_5$ and $f_6$ which do not overlap each other and do not overlap the frequency ranges of signals $f_1$, $f_2$ and $f_3$. For the second aircraft, another set of oscillators corresponding to oscillators 30, 44 and 62 will be required, each of which will produce frequencies equal to $f_1$, $f_2$ and $f_3$. However, these latter frequencies may be coupled to an oscillator mixer to produce resultant sum or difference frequencies which would be equal to $f_4$, $f_5$ and $f_6$ thereby avoiding any interference with the signals corresponding to the first aircraft. The second plane would be equipped with an oscillator mixer for demodulating the signals $f_4$, $f_5$ and $f_6$ so that the actual indicating apparatus in both the first and second aircraft would be tuned to exactly the same frequencies, i.e., $f_1$, $f_2$, $f_3$. In the event that the second aircraft is the only aircraft being guided into a landing by the ILS ground equipment, then if desired, a simple shorting switch could be used to bypass the additional oscillator mixer in the second aircraft. Alternatively, a separate RF channel may be used for each aircraft.

Figure 3:
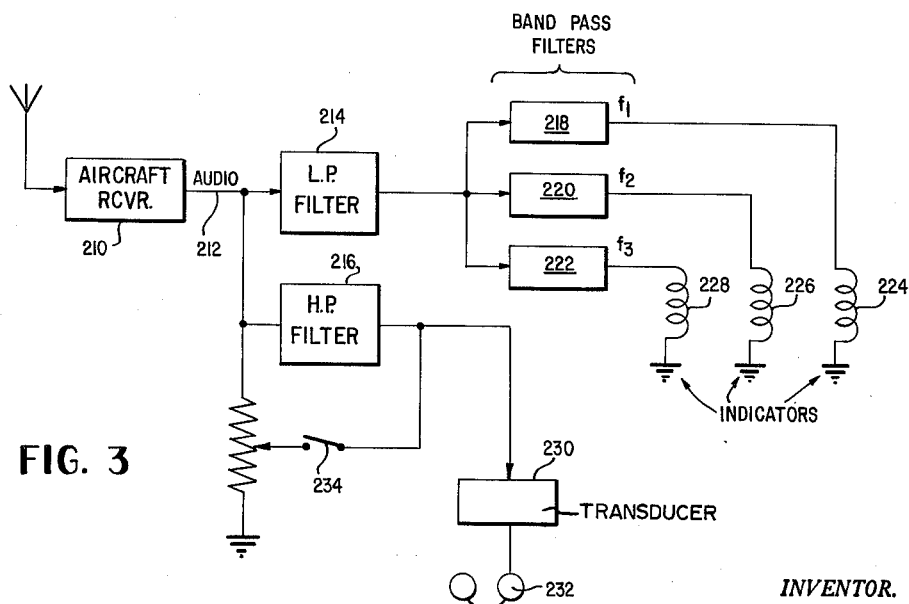
FIGURE 3 shows diagrammatically the aircraft receiver apparatus for use in conjunction with the ground apparatus shown in FIGURES 1 and 2.

FIGURE 3 shows in block diagram form the apparatus required in the aircraft for utilizing the signals received from radio transmitter 124. Receiving apparatus 210 receives the frequency modulated signals from transmitter 124 and demodulates them to provide a composite audio signal on conductor 212. This composite signal is applied both to a low-pass filter 214 and to a high-pass filter 216. The output of filter 214 contains the three frequencies $f_1$, $f_2$ and $f_3$ which are applied in parallel to individual band-pass filters 218, 220 and 222 to provide at their outputs audio frequency signals $f_1$, $f_2$ and $f_3$, respectively, which are then coupled to individual frequency responsive indicators 224, 226 and 228. High-pass filter 216 blocks the low audio frequencies $f_1$, $f_2$ and $f_3$ but passes the voice signals from microphone 66 or 126 to suitable transducing apparatus 230 to permit the aircraft pilot to listen to spoken instructions by means of earphones 232. In order to check the operation of indicators 224, 226, 228, the pilot may close a monitor switch 234 in order to bypass filter 216 and permit the audio frequencies $f_1$, $f_2$ and $f_3$ to be applied directly through transducer 230 to his earphones 232 so that he has aural assurance of proper functioning of the system.

Figure 4A:
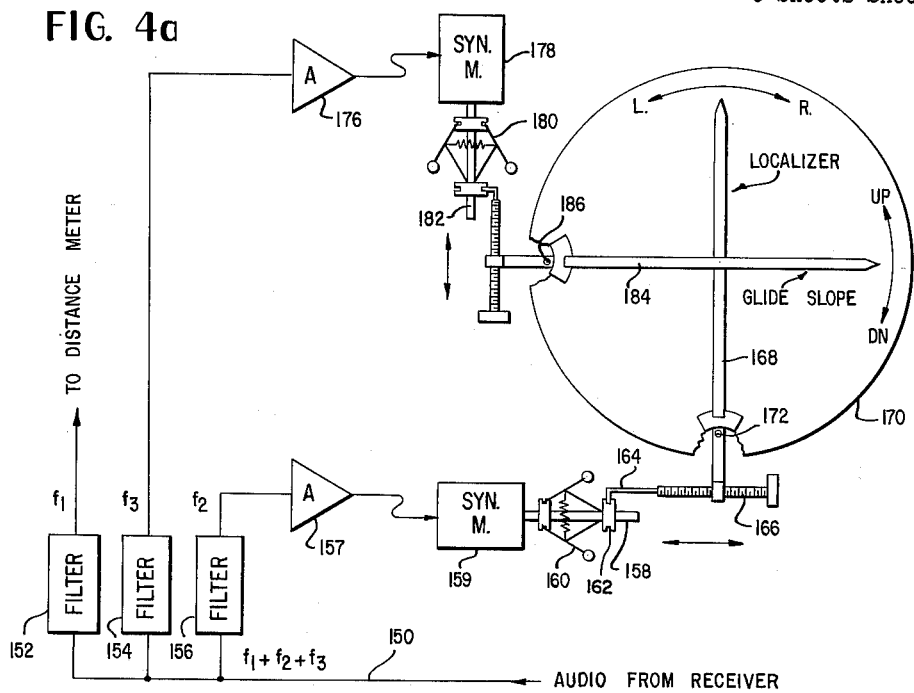
FIGURES 4a and 4b illustrate how present ILS indicators may be modified for use with the systems of FIGURES 1 and 2.
Figure 4B:
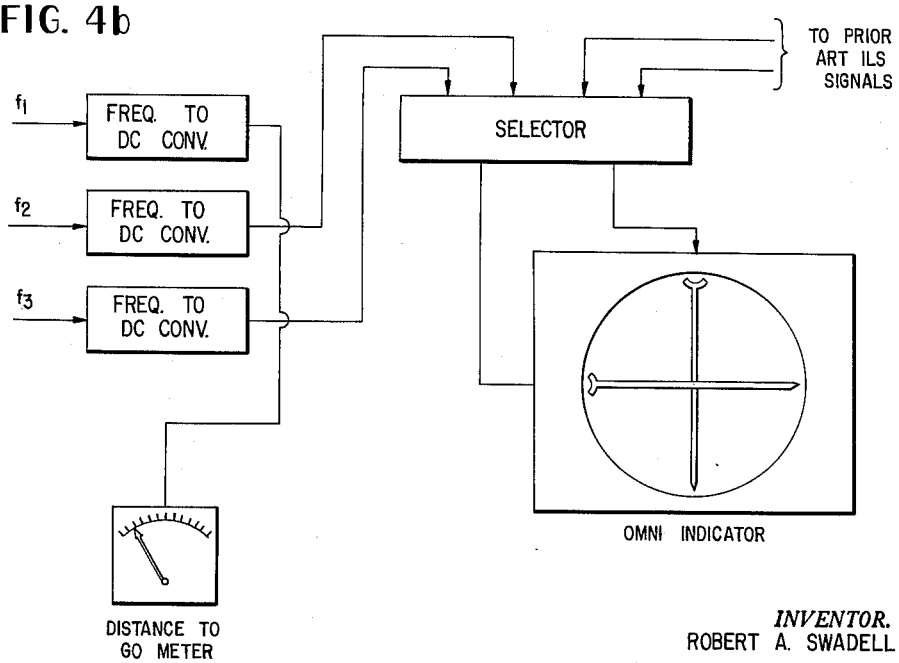
Figure 9A:
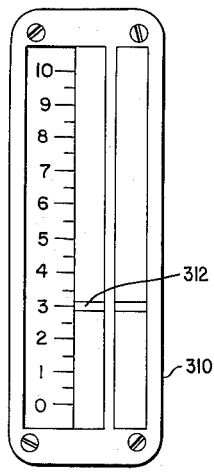
FIGURE 9a is a front view of an actual tuned reed distance indicator.

FIGURES 4a and 4b show how the frequencies $f_1$, $f_2$ and $f_3$ may be utilized to drive omni-indicators which are used in conjunction with instrument landing systems. In FIGURE 4a, the demodulated audio frequencies $f_1$, $f_2$, $f_3$ from the aircraft receiver appear on conductor 150 and are applied in parallel to filters 152, 154 and 156 which are tuned respectively to frequencies $f_1$, $f_3$ and $f_2$. The output of filter 152 is fed to a distance or range meter, which may be of the tuned reed type as shown in FIGURE 9a. Signal $f_2$ representing the course or azimuth of the approaching aircraft is fed through an amplifier 157 to drive a synchronous motor 159 whose output shaft 158 rotates at a speed proportional to the frequency $f_2$. Therefore, as $f_2$ varies within its prescribed range, shaft 158 varies correspondingly in rotational speed. A conventional centrifugal force-responsive device 160 is mounted on shaft 158 and is arranged to impart longitudinal movement to a slider 162 which is mechanically coupled via rod 164 to a threaded adjusting screw 166. The lower end of the azimuth pointer 168 of an omnimeter 170 is threaded on adjusting screw 166 and is mounted to pivot about point 172 thereon. The position of pointer 168 is adjusted by means of the calibrating screw 166. Once indicator 168 is calibrated, then pointer 168 pivots about point 172 to a degree which is directly proportional to the speed of the motor shaft 158 and thereby to the frequency $f_2$. Consequently, when pointer 168 is in its vertical position, the pilot knows that his aircraft is "on course" with respect to the glide slope, and when the pointer moves to either side of the vertical, then he knows that he is "off course." Signal $f_3$ is coupled in a similar manner through an amplifier 176 to a synchronous motor 178 which has a centrifugal ball device 180 mounted on its output shaft 182 to control the rotation of the relative altitude (glide slope) pointer 184 about the pivot point 186.

FIGURE 4b shows that in general the present omni-indicators may be converted for use with my improved ILS by providing any suitable frequency-to-D.C. converters. The pilot then manually operates a selector to connect his indicators to the signals corresponding to the type of ILS under which he is landing.

Another variation of a suitable indicator is shown in FIGURES 5a and 5b wherein the output from an amplifier, such as amplifiers 157 and 176, is applied to a synchronous motor 190 whose output drives a permanent magnet 192 disposed within an aluminum cup 194. The construction of elements 192 and 194 is similar to a conventional automobile speedometer. The aluminum cup has an output shaft 196 whose displacement varies in proportion to the speed of the synchronous motor 190 to move a pointer 198 through a corresponding angle about the pivot point 200, thereby providing a visual indication of either frequency $f_2$ or $f_3$. It is to be understood that any indicating device which converts the frequencies $f_2$ and $f_3$ to a corresponding mechanical indication would be suitable.

FIGURES 6, 7a and 7b show a novel tuned reed indicator which is part of my improved ILS system. A first set of tuned reeds 250 is suitably mounted in a holder 252. Reeds 250 are divided into a first group 254 and a second group 256. Holder 252 is U-shaped and has an upper leg 258 in which reeds 254 are mounted and a lower leg 260 in which reeds 256 are mounted. Mounted in a plane at right angles to the plane of the reeds 250 is a second set of reeds 262 fixed in a holder 264 which is disposed within the recess 266 in holder 252. As can be easily seen, such an arrangement permits a so-called cross presentation to the aircraft pilot with the ends of all the reeds vibrating in the same plane. The ends of the reeds are painted with a luminous coating to provide a sharply defined display.

Figure 10:
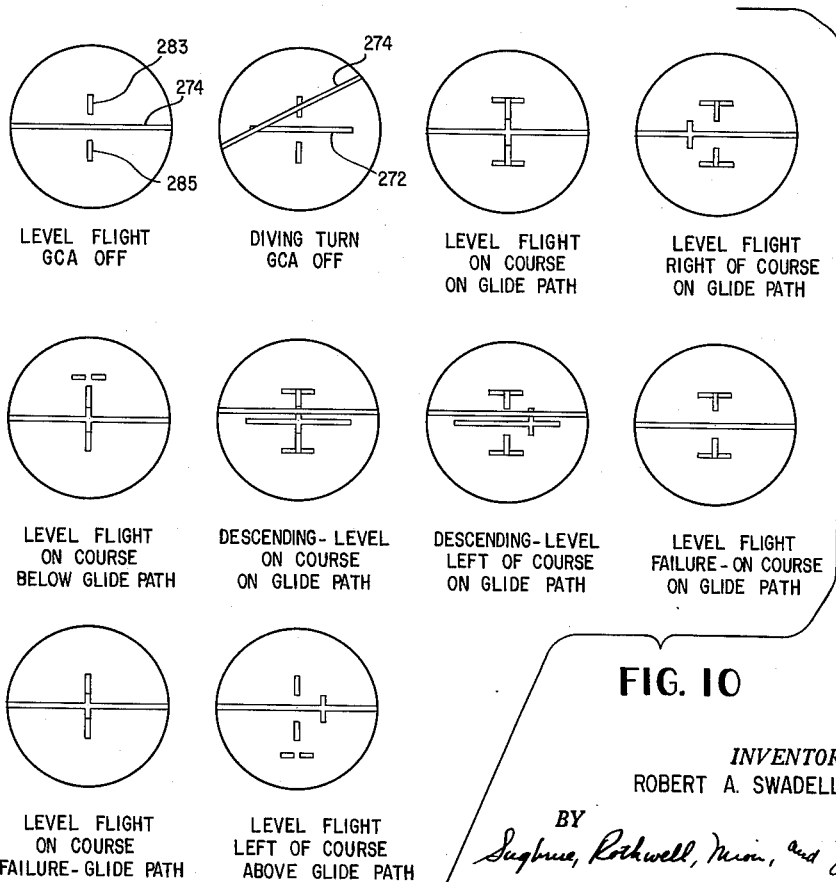
FIGURE 10 shows indicator displays corresponding to various combinations of positions and attitudes of the aircraft.

Reeds 250 and 262 are suitably mounted within the conventional climb and bank or attitude indicator already mounted on the instrument panel of aircraft. The mechanical output from the plane's gyroscopic system is coupled to the barrel 268 which in turn is coupled to attitude indicator 270 with respect to the fixed horizontal line 272 having a luminous portion 273. Horizontal luminous marker 274 rotates with indicator 270 so that when lines 274 and 272 do not coincide, the aircraft is not in level flight. Various possible indications on the indicator are shown in FIGURE 10.

Reeds 250 are suitably calibrated to vibrate in a frequency range of signals $f_3$ and reeds 262 are calibrated to vibrate in the range of signals $f_2$. In their quiescent state, reeds 262 are hidden from the pilot's view by the horizontal strip 272. However, when one of the reeds 262 responds to its tuned frequency, it begins to vibrate in a vertical plane so that it may be viewed by the pilot; for example, the reed 262a is shown vibrating in FIGURE 6 so that it can be viewed through the display opening 276 on either side of strip 272. The reeds 250 are responsive to frequencies in the $f_2$ range. When a reed is vibrated by its tuned frequency, it vibrates in a horizontal plane and becomes visible through the display openings 278 and 280. When reeds 250 are in a quiescent state they are blocked from view by means of the vertical strips 282 and 284 having luminous portions 283 and 285, respectively.

This novel split reed arrangement presents a visual display on a single indicator of the aircraft's course and altitude relative to the required glide slope. As shown in FIGURE 8, in order to achieve such a single plane presentation, reeds 250 are divided into groups 254 and 256 each containing reeds tuned to the same frequency. The numerals written on reeds 254 and 256 indicate the frequency in cycles per second to which an individual reed is tuned. For example, at a frequency of two hundred cycles per second the reeds 254a and 256a will vibrate. It will be noted that only at this frequency will the aircraft pilot see the presentation as shown best in FIGURE 6 wherein two of the reeds 254 will be viewed simultaneously in a vibrating condition. For any other frequency, only one vibrating reed will be seen by the pilot, thereby indicating that the aircraft is not on the proper glide slope. For any other signal frequency, the aircraft pilot will see at any given time only one of the reeds 250 vibrating either in display opening 278 or 280 but not in both display openings.

There is no need to provide any redundancy of frequency response in reeds 262 since only reeds 250 must be split in order to provide a single plane presentation. When the center reed 262a vibrates and becomes visible to the aircraft pilot, then the aircraft is "on course." Vertical strip portions 283 and 285 are provided to determine which vibrating reed is the "on course" indication. When the reed 262 aligned with these portions vibrates, the plane is "on course."

In the event that the audio frequencies transmitted by the group equipment vary slightly from their predetermined values, for example, two hundred cycles per second for reeds 250, the aircraft pilot may easily recalibrate his indicator by having the ground personnel send out a test signal indicative of the proper glide slope. For example, if such a test signal were transmitted and the two hundred cycle reeds did not vibrate to provide the proper display, then the pilot simply rotates the knob 288 to move vertically the reed holder 252 by means of the rack and pinion 290. If the test signal transmitted by the ground equipment were two hundred two cycles per second, then the knob 288 is rotated until the vibrating reed 254b is visible at the lower extremity of display opening 278 and the vibrating reed 256b is visible at the upper extremity of display opening 280. This mode of calibration is extremely simple and does not require a high degree of technological skill as is required to calibrate present systems.

FIGURES 7a and 7b show suitable tuned reed structures which may be used in the indicator shown in FIGURES 6 and 8. A signal $f$ containing the frequencies $f_1$, $f_2$ and $f_3$ is applied to a winding 300 wound on a magnetic core 302 which has mounted on its top surface an elongated pole piece 304 to coincide with the length of a set of tuned magnetic reeds 306. As is obvious, when the signal $f$ has a frequency corresponding to the tuned frequency of one of the reeds 306, then that reed will vibrate in resonance.

Figure 9B:
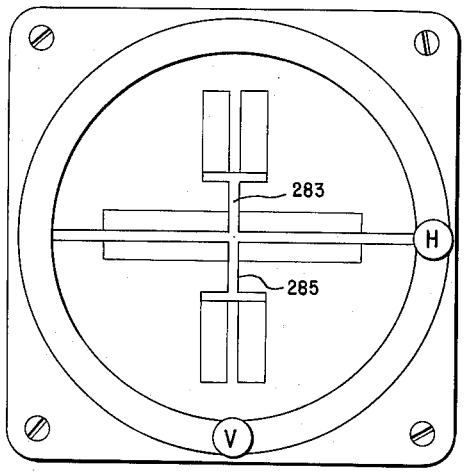
FIGURE 9b is a front view of an actual attitude indicator incorporating integrated glide slope and on-course displays in accordance with this invention.

FIGURE 9a shows a tuned reed distance indicator 310 as it actually would appear in the instrument panel of an aircraft. As shown there, when frequency $f_1$ is applied to the distance indicator, the tuned reed 312 vibrates thereby indicating a distance to go to touchdown of three miles. FIGURE 9b shows an actual climb-and-bank or attitude indicator with an integrated glide slope and "on course" display in accordance with this invention.

FIGURE 10 shows various displays of an integrated attitude indicator and ILS indicator embodied in this invention for various positions and attitude of the aircraft.

Figure 11A:
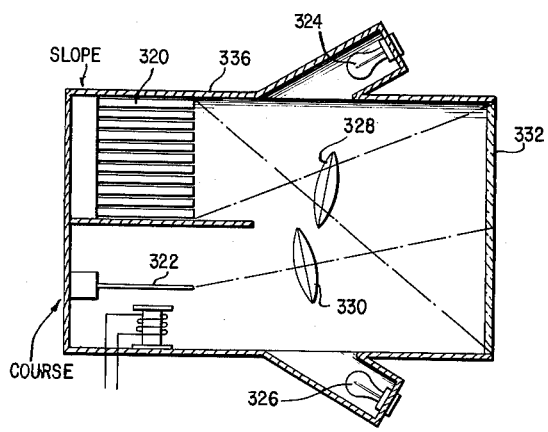
FIGURES 11a and 11b show side and front elevational views, respectively, of a modified reed indicator embodying this invention.
Figure 11B:
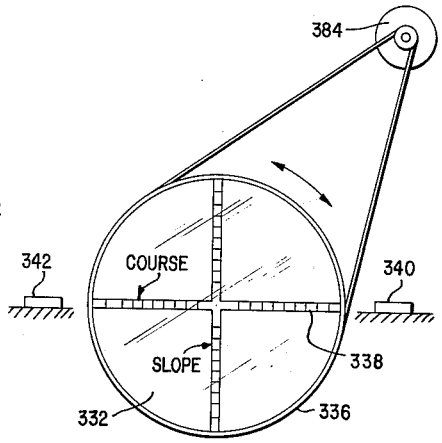

FIGURES 11a and 11b show a tuned reed ILS indicator utilizing an optical projection arrangement which eliminates the necessity for using the split reed structure shown in FIGURES 6 and 8. With this arrangement, the glide slope or relative attitude tuned reeds 320 are mounted in a plane perpendicular to plane "on course" tuned reeds 322. The ends of the reeds 320 and 322 may be painted white or silver to reflect the light from lamps 324 and 326. The reflected light passes through lenses 328 and 330 to focus on the ground glass 332 a crossed, single plane presentation of one vibrating reed in each of the groups of reeds 320 and 322. The presentation shown in FIGURE 11b represents an "on course" and "on slope" flight of the aircraft. As with the split reed indicator, a motor 384, driven by the plane's gyroscopic system, may be directly connected to the indicator barrel 336 to rotate the horizontal display opening 338 relative to the fixed markers 340 and 342 to indicate the attitude of the aircraft.

Figure 12A:
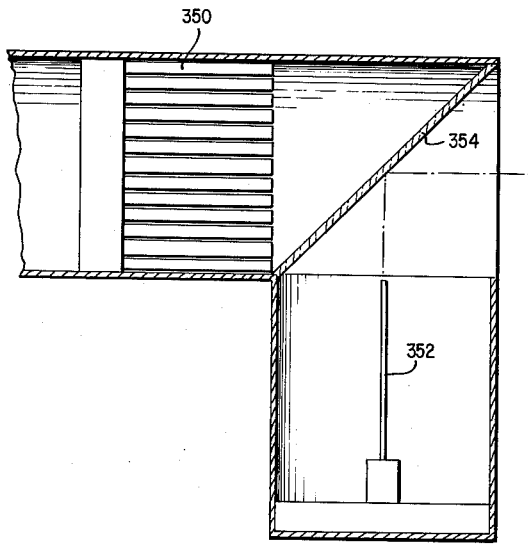
FIGURES 12a and 12b show side and front elevational views, respectively, of another modified reed indicator embodying this invention.
Figure 12B:
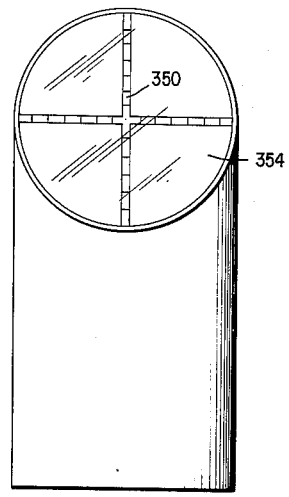

FIGURES 12a and 12b show another modified tuned reed indicator wherein the vibrating reeds may be viewed directly by the aircraft pilot. The glide scope on relative altitude tuned reeds 350 are mounted in a plane normal to the plane of the "on course" reeds 352. However, a half silvered mirror 354 is disposed intermediate the ends of the tuned reeds 350 and 352 and acts as a beam splitter so that the aircraft pilot sees a simultaneous display of two reeds, one from each of the sets of vibrating reeds 350 and 352, thereby presenting an optical illusion of vibration of both reeds in the same plane as shown in FIGURE 12b which represents an "on course" and "on guide slope" presentation.

Preferred embodiments of this invention have been described in the foregoing specification and illustrated in the drawings, but it is specifically contemplated that modifications thereof and additions thereto will be obvious to those skilled in the art and such modifications and additions are specifically contemplated to be a part of this invention, the scope of which is limited only as defined in the appended claims.

What is claimed is:

1. A tuned reed indicator for use in an instrument landing system for an aircraft, said indicator comprising a first set of reeds arranged in a first plane and each tuned to vibrate at a one of a first range of frequencies, and a second set of reeds arranged in a second plane transverse to said first plane and each tuned to vibrate at a one of a second range of frequencies, one of the sets of reeds having a gap therein for receiving the other set.

2. A tuned reed indicator as defined in claim 1 wherein corresponding reeds of said one set on opposite sides of said gap are tuned to the same frequency.

3. A tuned reed indicator as defined in claim 2 wherein said first and second planes are normal to each other and further comprising a housing within which said reeds are mounted, said housing being adapted to be rotated by gyroscopic means within the aircraft, and an attitude indicator rigidly coupled to said housing and disposed in a plane normal to said first and second sets of reeds, said sets of reeds being fixed relative to the rotation of said housing.

4. A tuned reed indicator as defined in claim 1 wherein said indicator further comprises a viewing panel having apertures therein to permit the aircraft pilot to view the ends of said vibrating reeds, said first set of reeds containing said gap for receiving said second set, thereby dividing the reeds of said first set into two groups, the reeds in each group being tuned to the same frequencies within said first range, said panel containing a longitudinally extending portion disposed to block from the pilot's view the ends of the reeds in said first set which are not vibrating, said reeds in said two groups being so arranged that two simultaneously vibrating reeds are viewable through said panel at only a single predetermined frequency within said first range.

5. A tuned reed indicator as defined in claim 4 further comprising means for varying the relative positions of said first set of reeds and said panel portion to adjust said predetermined frequency accordingly.

6. An instrument landing system for an aircraft comprising means located remotely from the aircraft for generating a plurality of signals indicative of the required glide path for landing the aircraft, said signals being of different frequencies, a first frequency being indicative of the azimuth of the required glide path with respect to a predetermined landing point, a second frequency being indicative of the elevation angle of the required glide path for all points along the glide path, means to vary said first and second frequencies to correspond to the actual aircraft azimuth and elevation angle relative to the required glide path, respectively, of the aircraft, and two sets of frequency responsive reeds located in said aircraft to provide an indication of both the actual position of the aircraft and of said required glide path, the ends of said both sets of reeds being disposed to vibrate in the same plane, said sets being disposed at right angles with respect to each other to provide in a single indicator a visual representation of the actual position of the aircraft with respect to the required glide path for landing.

References Cited by the Examiner

UNITED STATES PATENTS

| | | | |
|---|---|---|---|
| 1,860,285 | 5/32 | Gunn | 343—109 |
| 1,865,826 | 7/32 | Brockstedt | 343—107 |
| 2,120,245 | 6/38 | Dunmore | 343—109 |
| 2,422,134 | 6/47 | Sanders | 343—14 |
| 2,459,482 | 1/49 | Bond | 343—6 |
| 2,480,068 | 8/49 | Wolff | 343—6 X |
| 2,514,351 | 7/50 | Smith | 343—6 |
| 2,585,855 | 2/52 | Sherwin et al. | 343—5 |
| 2,782,411 | 2/57 | McNaney | 343—6 X |
| 2,982,954 | 5/61 | Gross | 343—6 |

OTHER REFERENCES

"Design of Tuned Reed Course Indicators for Aircraft Radio-Beacon," by F. W. Dunmore, Bureau of Standards, Research Paper No. 28, November 1928.

"A Tuned-Reed Course Indicator for the 4 and 12 Course Aircraft Radio Range," by F. W. Dunmore, Bureau of Standards, Research Paper No. 160, April 1930.

CHESTER L. JUSTUS, *Primary Examiner.*